March 5, 1940.  W. G. WILSON  2,192,339

RECIPROCATING VALVE

Filed March 5, 1938

INVENTOR.
Wylie G. Wilson
BY Ramsey, Kent, Chisholm and Lutz
his ATTORNEYS

Patented Mar. 5, 1940

2,192,339

UNITED STATES PATENT OFFICE 2,192,339

RECIPROCATING VALVE

Wylie G. Wilson, Elizabeth, N. J.

Application March 5, 1938, Serial No. 194,041

10 Claims. (Cl. 251—27)

This invention relates to improvements in valves, particularly in valves of the reciprocating type.

This application is a continuation in part of my copending application Serial No. 758,730, filed December 22, 1934, for Reciprocating valves.

A primary object of the invention is to provide a reciprocating valve of high efficiency and of low cost of manufacture and maintenance. This object is attained by the use of a simple distortable sleeve, one end of which is distorted into contact with an abutment wall by a sloping face, producing a highly efficient sealing contact between the sloping face and the sleeve as well as between the sleeve and the abutment wall. By a proper arrangement of parts these sealing contacts are used to control the passage of fluid through the valve.

Another object of the invention is to provide an improved reciprocating valve in which the parts of the head are so balanced that the head is accurately guided by the valve stem when the stem is in a horizontal position, thereby avoiding tilting of the head, or the necessity for any special guide for the head.

While preferred forms of the invention are disclosed herein for the purposes of illustration, it should be understood that various changes may be made in structure without departing from the spirit of the invention as herein set forth and claimed.

The valve sealing parts of this invention comprise the following three basic elements:

A. Distortable sleeve

One of the sealing elements is a distortable sleeve having a thin wall and relatively great length, the axial length of the sleeve being preferably at least twice the cross-axial thickness of the sleeve wall.

By saying that the sleeve is "distortable" it is meant that the sleeve is of such proportions and material that one of its ends can be either expanded or contracted a slight amount without rupture. The material of the sleeve must have sufficient elasticity as to permit such distortion, and to tend to regain initial shape once the distorting force is relieved while being hard enough to withstand high sealing pressures over a long period of time. In general any material suitable for the sealing elements of the valve may be used, such as Monel metal, stainless steel, brass, or the like.

It is desired to have the sleeve yield as readily as possible, and its wall is therefore made as thin as conditions, such as requirements of strength for handling, and resistance to erosion and corrosion in use, permit. Furthermore, the long sleeve permits the lower end of the sleeve to retain its original form in spite of the distortion of the upper end.

Where one end of a sleeve is positively held, the ease with which the free end of the sleeve can be distorted varies (other factors being equal) with the length of the sleeve, and this is a further important reason for using a relatively long sleeve.

B. Sloping face

The sloping face, which presses against and distorts (expands or contracts) one end of the distortable sleeve, should be formed of material harder than that of the sleeve, for example, tool steel, nitrided steel, or very hard bronze. This sloping face should have a relatively acute angle, preferably somewhere around 16°, relative to the axis of the distortable sleeve.

C. Abutment wall

The abutment wall should be a relatively rigid and undistortable part forming the abutment against which the end of the distortable sleeve is pressed by the sloping face, and which limits the amount of distortion of the sleeve. This abutment wall should provide a positive resistance at or near the end of the sleeve which is distorted.

A preferred embodiment

Figure 1:
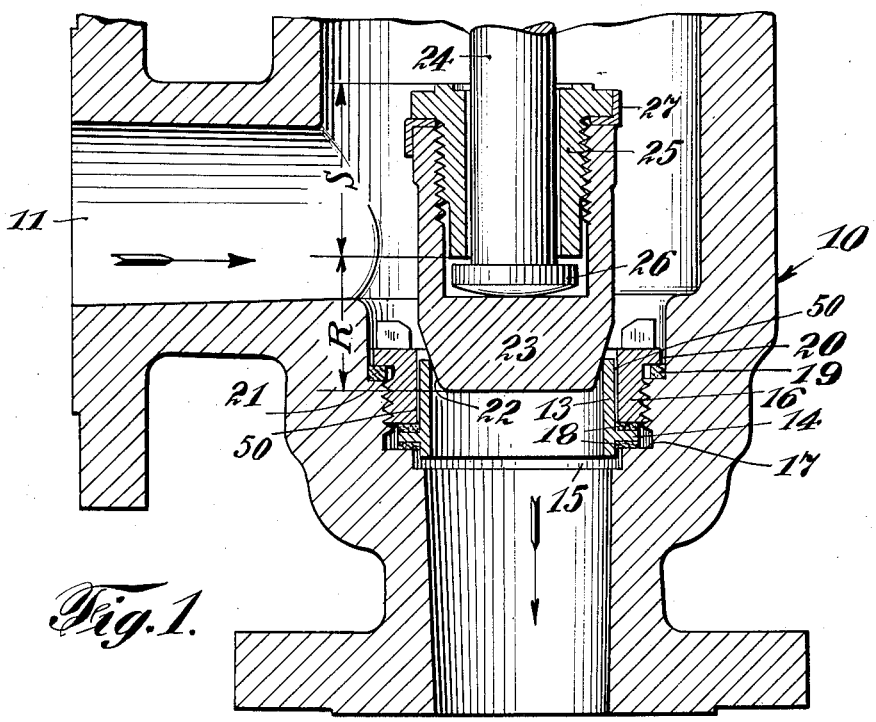
Fig. 1 is a fragmentary section through a valve embodying the invention.

A preferred embodiment of the invention is illustrated in Fig. 1, where 10 represents the casing of an angle valve having a port 11 and a port 12.

In this case the distortable cylindrical sleeve is shown at 13, and carries an outwardly extending flange 14. A counter-bore 15 permits the sleeve to sit into the valve body so that the bore through the sleeve is practically as large as the bore through the port. The sleeve is held in place by retainer 16 which has screw-threaded engagement with the valve casing and presses flange 14 toward seat 17. In order to prevent leakage between the sleeve and the retainer, or between the retainer and the casing, gaskets 18 are placed on the upper and lower sides of the flange 14, and a gasket 19 is placed between flange 20 formed on the upper end of the retainer, and seat 21. The gasket 19 is preferably more yieldable than the gaskets 18, in order to insure perfect sealing at both the upper and lower ends of the retainer, the yieldability of gasket 19 permitting gaskets 18 to be tightly compressed. A further advantage of this arrangement of gaskets is that the threads of the retainer are protected against corrosion at each end of the threaded portion. The gaskets 18 and 19 are formed of asbestos in the preferred embodiment, and they are not lubricated. Under these conditions the gaskets form a bond with the metal surfaces with which they contact when subjected to heat and pressure, and thus a definite resistance is produced to rotation (unscrewing or slacking back) of the retainer 16.

It is desirable that the sleeve 13 shall fit in the retainer 16 with a small amount of clearance between these parts so that the sleeve can be expanded the amount necessary to cause it to conform in shape with the plug in the manner to be explained later. For this purpose, in the drawing, the space 50 between the sleeve and the retainer 16 has been greatly exaggerated, since if the drawing were made to scale the clearance between the parts 13 and 16 would be so small as to be practically unnoticeable. As a result of this clearance, it follows that the sleeve has a free-sliding fit relative to the retainer 16 to facilitate assembly. The retainer 16 has a relatively thick wall and since it is screwed tightly home into the body its inner periphery forms a rigid abutment wall for sleeve 13.

In this embodiment the frusto-conical face 22 is formed on a plug 23 carried by a stem 24, which may be reciprocated by screw threads, or by any other suitable means. The upper end of the plug 23 is formed with a socket, and a retainer 25 has threaded engagement with the socket and contacts with a flange 26 formed on the lower end of the stem. A distortable lock washer 27 prevents accidental loosening of retainer 25.

The lower end of the plug is relatively heavy, that is, there is a considerable thickness of material lying between the lower end of stem 24 and the lower end of the plug. This thickness is necessary in order to prevent distortion of the plug under the sealing pressure of the stem. As the result of the length of the plug from the lower end of the retainer to the lower end of the plug, (distance R of Fig. 1) there would normally be a tendency for the end of the plug to tilt downward when the valve is installed with the stem 24 in horizontal position, and the plug could not then enter the sleeve accurately and without rubbing against a portion of the sealing edge of the sleeve in a manner which might be detrimental.

To avoid this tilting tendency, and without providing any special guide for the plug, the parts are constructed so that the stem 24 acts as a guide for the plug. This is done by making the upper part of the plug long enough that the part of the plug lying above the lower end of the retainer 25, together with the parts attached thereto, such as the retainer and the lock washer, (distance S of Fig. 1), is of a weight equal to, or greater than that of, the lower end of the plug (distance R). The retainer has a small clearance about the stem and it merely lies in contact over its full length with the stem, the axis of the plug being parallel to that of the stem, but offset a slight distance equal to the clearance of the retainer about the stem.

A valve of this preferred construction has given very satisfactory results with a plug formed of nitrided steel and a distortable sleeve formed of Monel metal, the sleeve for a 2 in. valve being 2 in. in diameter and ¾ in. long, with a wall ⅛ in. thick.

*Operation*

When the plug is pressed into the sleeve by ordinary operating pressure it expands the upper end of the sleeve against the circular abutment wall formed by retainer 16. Since it is practically impossible to manufacture a plug of perfect circularity it follows that this expansion permits the sleeve to adapt itself to the shape of the plug with consequent tight sealing between the sleeve and the plug. At the same time a relatively good seal is formed between the sleeve and the abutment wall, but such seal is of secondary importance. The high efficiency of this simple and economical construction lies in the fact that the sleeve conforms to any inaccuracy of outline of the plug and thereby compensates for such inaccuracy. When the plug is withdrawn to open the valve, the sleeve, being made of relatively elastic material, tends to regain its original form so that when the plug is again introduced into the sleeve it will cause such expansion of the sleeve as to again form a perfect seal. The original fit of the distortable sleeve in the abutment wall having been made with a slight clearance the abutment wall prevents further yielding of the sleeve after it has yielded the slight amount necessary to conform itself to the shape of the plug.

In this construction, if the sleeve were short, the pressure of the plug would tend to cone the entire sleeve, and the flange 14 would also become coned and would no longer have its faces parallel with the cooperating faces on the casing and retainer.

An important advantage of the present invention resides in the ease with which the only part requiring replacing, that is, the distortable sleeve, can be removed and replaced. Since the sleeve is designed to fit within the member 16 with slight clearance, the sleeve can be readily replaced by another sleeve which can be manufactured without requiring such accuracy as would be necessary if the fit were of a closer character. After continued use it is possible that the sleeve may acquire a permanent set closely engaging the abutment wall and as a result thereof it may be desirable to replace the sleeve. In this event some force may be necessary to remove the sleeve and accordingly such removal can be accomplished readily since the sleeve once having acquired a permanent fit adheres to the retainer 16 and these parts can be removed from the assembly and placed on any convenient support for separation.

Figure 2:
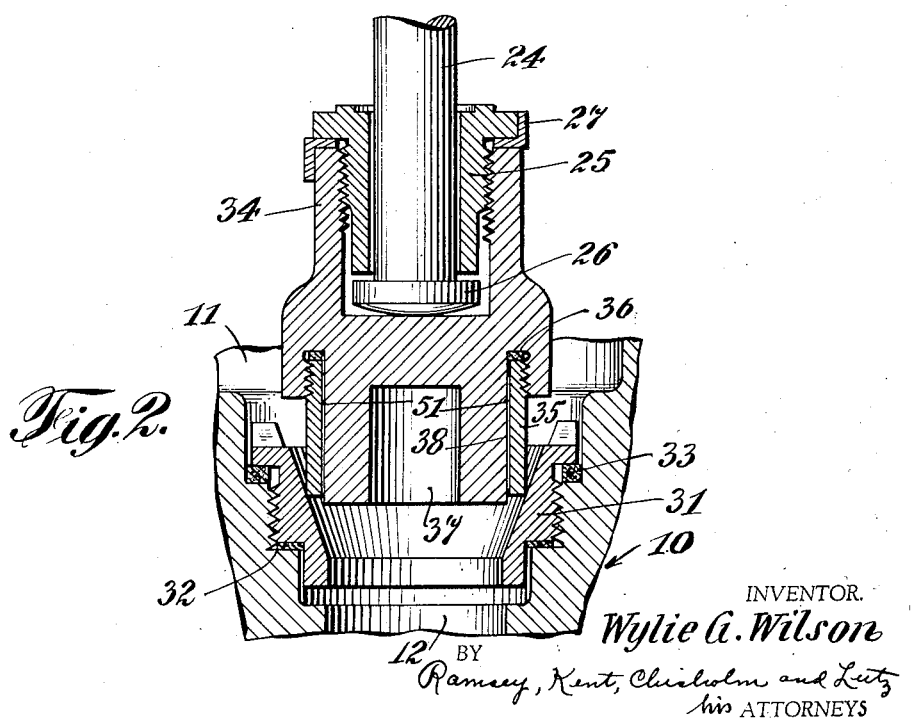
Fig. 2 is a fragmentary section illustrating a modification.

Fig. 2 illustrates an arrangement in which the position of the parts is the reverse of that shown in Fig. 1, as the sloping surface is attached to the casing, and the abutment wall and distortable sleeve are carried by the valve stem.

In this form the bushing 31 is of suitable hard material and is formed with an internal tapered surface. This bushing is threaded into the casing, a hard gasket 32 being inserted at the lower end of the screw thread and a soft gasket 33 being inserted at the upper end of the thread. These gaskets serve the same purposes as the gaskets 18 and 19 of Fig. 1.

The valve stem 24 carries a head 34, the lower cylindrical end of which forms the abutment wall. The distortable sleeve 35 surrounds the cylindrical abutment wall and is threaded into a recess formed in the head, a gasket 36 being placed in the bottom of the recess. The sleeve 35 as in the case of the sleeve 13 surrounds the cylindrical abutment wall with a small clearance which clearance has been shown again in exaggerated form at 51 for the same purpose as that shown at 50.

Any other suitable means may be used for holding the bushing 31 and sleeve 35 in place.

The sealing action of the parts in this form of the invention is identical with that of Fig. 1, the sole difference being that the distortion of the sleeve takes the form of contraction instead of expansion as in Fig. 1.

If desired the lower end of the head 34 may be hollowed out as shown at 37, this lightening of the lower end making it possible to balance the head against tilting with less weight at the upper end of the head. But the supporting wall 38 must be kept sufficiently thick to offer rigid and unyielding support for sleeve 35.

The arrangement of the parts whereby the head is balanced so as to be guided by the stem is not confined to use with the sealing parts disclosed herein, and similarly the arrangement of gaskets used in connection with the retainer 16 and bushing 31 is of general application.

I claim:

1. A valve comprising, a rigid abutment wall, a relatively thin walled distortable sleeve of relatively hard elastic material having a length considerably greater than the thickness of its wall, the distortable sleeve being arranged in close proximity to the abutment wall with a slight clearance therebetween so that one end of the sleeve is movable to a slight degree relative to the abutment wall, and a distorting member movable relative to the sleeve so as to distort one end of said sleeve into sealing engagement with said distorting member.

2. A valve comprising, a rigid abutment wall, a relatively thin walled distortable sleeve of relatively hard elastic material having a length considerably greater than the trickness of its wall, the distortable sleeve being arranged with its wall in close proximity to the abutment wall with a slight clearance therebetween so that one end of the sleeve is movable relative to the abutment wall, and a distorting member having a sloping face movable relative to the sleeve so as to cause the sloping face to engage an annular edge of one end of the sleeve and distort said sleeve into sealing engagement with said distorting member.

3. A valve comprising, a relatively thin walled distortable sleeve of relatively hard elastic material having a length considerably greater than the thickness of its wall, a member having a sloping face of material harder than that of the distortable sleeve and movable relative to the sleeve, said face being adapted to engage and distort one end of the sleeve into sealing engagement therewith, and a rigid abutment wall arranged to support the sleeve and so spaced relative therewith as to prevent more than a predetermined amount of sleeve distortion.

4. A valve comprising, a relatively thin walled cylindrical sleeve of relatively hard elastic material having a length at least twice the thickness of the wall, a member having a frusto-conical face of material harder than that of the distortable sleeve and movable relative to the sleeve to control fluid flow between the face and the sleeve, said face being adapted to engage and distort one end of the sleeve into sealing engagement therewith, and a rigid cylindrical abutment wall arranged concentric with the sleeve and in close proximity to the sleeve to support the sleeve, said abutment wall being so spaced relative to the sleeve as to prevent more than a predetermined amount of sleeve distortion.

5. A valve comprising, a cylindrical rigid abutment wall, a cylindrical distortable sleeve of relatively hard elastic material having a thin wall and a length at least twice the wall thickness, the distortable sleeve being arranged in close proximity to the abutment wall with a slight clearance therebetween so that one end of the sleeve is movable to a slight degree relative to the abutment wall, and a member having a frusto-conical face of material harder than that of the distortable sleeve and movable relative to the sleeve so as to engage and distort one end of the sleeve toward the abutment wall thereby forming a sealing contact between the frusto-conical face and the distortable sleeve.

6. A valve comprising, a casing having a port, and a counter-bore forming a shoulder surrounding the port, a bushing threaded into the counter-bore, the bushing having a bore forming a cylindrical abutment wall, a cylindrical expansible sleeve having a relatively close fit within the bore, the sleeve having a thin wall and a length at least twice the wall thickness, the expansible sleeve having adjacent one end a flange clamped between the bushing and said shoulder, a plug having a frusto-conical face of material harder than that of the expansible sleeve, and a reciprocable stem connected to the plug and adapted to press said frusto-conical face into engagement with the end of the sleeve farthest remote from the flange, expanding the end of the sleeve into close contact with the abutment wall, thereby forming a sealing contact between the frusto-conical face and the expansible sleeve and between the expansible sleeve and the abutment wall.

7. A valve comprising, a casing having a port, and a counter-bore surrounding the port, a bushing threaded into the counter-bore and having a frusto-conical face of relatively hard material, a head having a cylindrical outer surface forming an abutment wall, a cylindrical compressible sleeve attached to the head and having a relatively close fit over the abutment wall, the sleeve having a thin wall and a length at least twice the wall thickness, and a reciprocable stem connected to the head and adapted to press the sleeve into engagement with the frusto-conical face, compressing the end of the sleeve into contact with the abutment wall, thereby forming a sealing contact between the frusto-conical face and the compressible sleeve, and between the compressible sleeve and the abutment wall.

8. In combination a valve body having a threaded bore, an inwardly extending shoulder below the threads, an outwardly extending shoulder above the threads, a member threaded into the bore and having faces cooperating with the inward and outward shoulders, a first packing interposed between said member and the inward shoulder, and a second packing interposed between said member and the outward shoulder, one of said packings being yieldable more readily to compression than the other.

9. In combination a valve body having a threaded bore, an inwardly extending shoulder below the threads, an outwardly extending shoulder above the threads, a member threaded into the bore and having faces cooperating with the inward and outward shoulders, a first packing interposed between said member and the inward shoulder, and a second packing interposed between said member and the outward shoulder, the second packing being yieldable more readily to compression than the first packing.

10. In combination, a valve body having a bore with an inwardly extending shoulder at the bottom thereof and an outwardly extending shoulder at the top thereof, a member in the bore having faces cooperating with the inward and outward shoulders, a packing interposed between said member and the inward shoulder, a packing interposed between said member and the outward shoulder, one of said packings being yieldable more readily to compression than the other, and means for compressing the packings between the shoulder of the bore and the cooperating faces of the member.

WYLIE G. WILSON.